W. H. DUNKLEY.
UNDERCARRIAGE FOR VEHICLES.
APPLICATION FILED JUNE 15, 1920.

1,424,345.

Patented Aug. 1, 1922.
2 SHEETS—SHEET 1.

Inventor-
William Henry Dunkley
By- B. Singer
Atty.

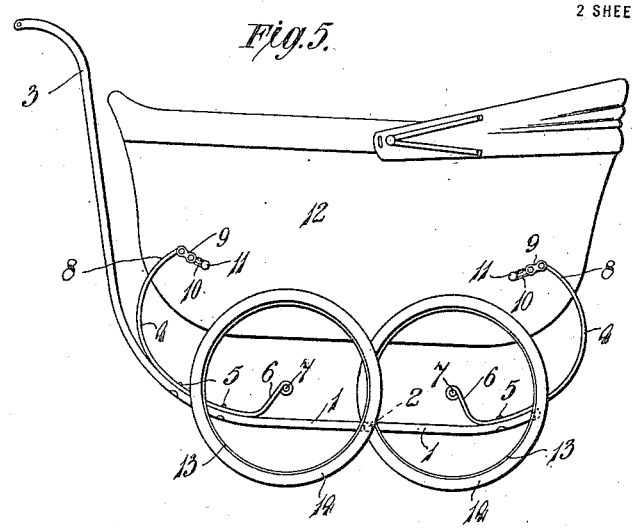
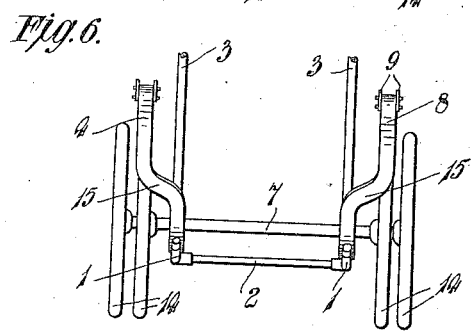
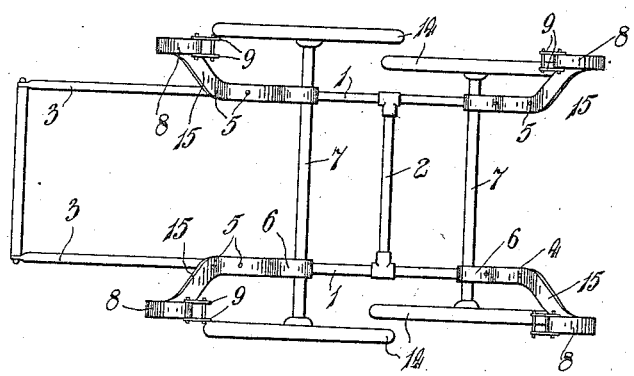

UNITED STATES PATENT OFFICE.

WILLIAM HENRY DUNKLEY, OF BIRMINGHAM, ENGLAND.

UNDERCARRIAGE FOR VEHICLES.

1,424,345.  Specification of Letters Patent.  Patented Aug. 1, 1922.

Application filed June 15, 1920. Serial No. 389,228.

*To all whom it may concern:*

Be it known that I, WILLIAM HENRY DUNKLEY, a subject of the King of Great Britain, residing at Dunkambulator Works, 75 Jamaica Row, Birmingham, in the county of Warwick, England, have invented certain new and useful Improvements in Undercarriages for Vehicles (for which I have obtained a patent in Great Britain, No. 108,010, dated July 17, 1917, and No. 135,760, dated April 22, 1919); and I do hereby declare the following to be a full, clear, and exact description of the same.

This invention relates to undercarriages for vehicles generally but is particularly applicable to such vehicles as perambulators or bath chairs which are provided with a handle whereby the vehicles may be propelled and has for its object to provide a generally improved construction whereby the centre of gravity of the perambulator can be brought as low as possible and also whereby any vibration or jolting which occurs at the wheels will not be transmitted either to the body or the handle.

One feature of my invention is to attach a body supporting frame which includes a pair of longitudinal members passing beneath the axles, to the wheel axles and also to attach the body to said longitudinal members by means of springs.

I may for instance combine with a body supporting frame, two pairs of springs each spring being attached intermediate its ends to one of the longitudinal frame members and having one free end attached to a wheel axle and the other free end to the body by the usual means.

Another feature of my invention relates to the manner in which the body of the vehicle is supported and the object of this part of my invention is to provide an improved method of securing the body to the chassis and also to provide certain means whereby the centre of gravity of the vehicle as a whole is lower than is usually the case.

The improved means of securing the body to the chassis consists in arranging that the body supporting members or springs are disposed at the sides of the body of the vehicle instead of at the ends as is usually the case. The body is provided with a pair of rods which pass therethrough and have projecting ends, and the upper ends of the springs or body supporting members are secured to these projecting ends.

With the object of lowering the centre of gravity of such vehicles and also with the object of allowing the springs or body supporting members to have their upper ends disposed at the sides of the body without unduly widening the wheel base, I provide improved body supporting members or springs which have their upper ends spaced apart more widely in a transverse direction than are their lower ends. These body supporting members or springs may be cranked or curved in a transverse direction in relation to the length of the vehicle so as to bring their lower ends closer together than are their upper ends.

In addition I may provide a frame disposed around the wheels of the vehicle. The purpose of this frame is mainly to act as a guard to prevent the clothing from coming into contact with the wheels.

Referring to the drawings:—

Figure 5 is a view in side elevation of another construction of perambulator constructed in accordance with my invention.

Figure 6 is an end view corresponding to Figure 5 but with the body removed.

Figure 7 is a plan view corresponding to Figure 5 but with the body removed.

Figure 1:
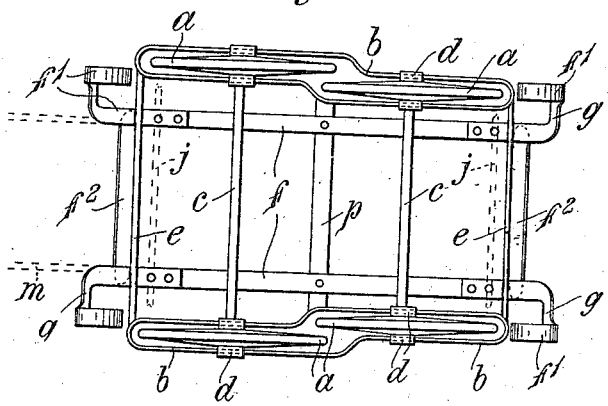
Figure 1 is a plan view of a perambulator chassis with the body removed.
Figure 2:
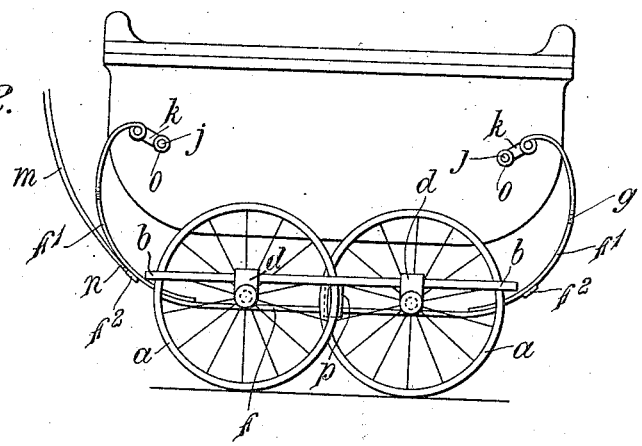
Figure 2 is a view in side elevation showing the body attached.
Figure 4:
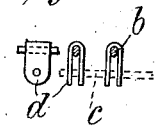
Figure 4 is a detail view.
Figure 3:
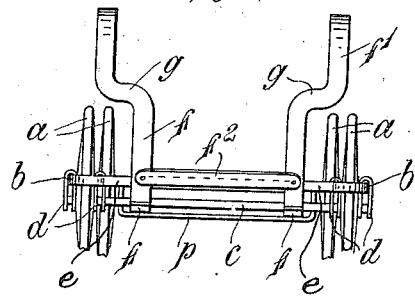
Figure 3 is an end view of the under carriage with the body removed.

Referring to Figures 1–4 frames $b$ are provided which project in front and to the rear of the wheels and are arranged with their outer bars on the outer side and their inner bars on the inner side of the wheels $a$ of the vehicle so as to form guards for preventing the clothing from coming into contact with the wheels. The frames $b$ are held together by transverse rods $e$ and by a central cross piece $p$. The axles $c, c$ of the vehicle carrying the wheels $a$ may either be continuous as shown or the wheels may be carried upon short stub axles carried by the frames $b$ and attached thereto by clips such as $d$ (Figure 4).

The body is supported upon springs $f^1$, $f^1$ which are attached to cross members $f^2$ and to longitudinal members $f$. The members $f$ may be secured to the frames $b$ by the cross piece $p$ or the springs $f$ may be secured to the axle $c$ by screws or any other suitable means.

The springs $f^1$ are cranked as shown at $g$ so that their upper ends are disposed apart more widely than are their lower ends so that the body of the perambulator can be located between them. By this method of supporting the body a more secure support is provided as the upper ends of the springs are disposed at the sides of the body instead of at the ends as is usually the case with perambulators. In addition the body can be disposed in a lower position than is usual as it is able to be lowered between the outwardly cranked upper ends of the springs.

The end of each spring $f^1$ carries a link $k$ and the links $k$ are connected to the projecting ends of rods $j$ which pass through the body of the vehicle and are secured to the links $k$ at $o$. The rods $j$ may pass through the body of a perambulator below the seats.

Instead of links such as $k$ I may use coiled springs or straps for connecting the ends of the springs to the ends of the rods $j$.

Instead of attaching the handle directly to the body I may provide longitudinal rods such as $m$ which are connected at $n$ to the springs $f^1$. In this way the handle is insured from any jars to which the vehicle may be subjected. Further, by attaching the handles to the springs in this manner I make it easier to raise the forward end of the vehicle by pressing downwardly upon the handles owing to the increased leverage obtained.

In the construction illustrated in Figures 5, 6 and 7 I provide a body supporting frame which includes two longitudinal members 1 joined together by a transverse member 2. The members 1 may be tubular or of other suitable cross section. As shown in Figure 5 the members 1 are continued upwardly at the rear end of the carriage to form the handles 3.

To each of the members 1 are attached a pair of springs 4. These springs 4 are riveted or otherwise secured to the members 1 at 5 intermediate the ends of the springs. One free end of each spring 6 is attached to one of the wheel axles 7, and the other free end of each spring 8 carries a shackle 9 which is attached to the body in the usual way. In the construction illustrated the shackles 9 are attached to the body by straps 10 passing around the projecting ends of rods 11 which pass through the body 12.

The wheels 13 which may be provided with pneumatic or other tires 14 are mounted on ball bearing hubs carried by the ends of the axles 7.

As will be seen from Figures 6 and 7 the springs 4 are cranked outwardly at 15 to allow the body 12 to pass down between them. The road wheels 13 are arranged in overlapping relation as shown in Figure 5.

In practice it is found that the arrangement described and shown provides a compact design of perambulator and allows the centre of gravity to be brought as low as possible, whilst any jolting at the road wheels is absorbed by the ends 6 and 8 of the springs 4 so that it is not felt either at the body 12 or the handle 3.

Further, the arrangement described, wherein the handle is integral with or attached to the longitudinal frame members and the latter are disposed much lower than is usual allows the perambulator to be tilted up upon its rear wheels with much greater ease than usual owing to the greater length of leverage obtained. Such tilting is of course, frequently necessary when getting perambulators up steps or curbstones or when turning corners.

In applying my invention to wheeled vehicles generally I provide a frame supported from the wheel axles by springs and the body of the vehicle is carried on springs by said frame. In the case of a motor vehicle the engine and gearing may conveniently be carried by said frame.

What I claim then is:—

1. In a perambulator vehicle, a pair of axles, wheels on said axles, longitudinally disposed chassis members, means connecting said axles to said longitudinal chassis members, a body, body supporting members, the upper ends of said members being spaced apart in a transverse direction more widely than the lower parts of said members.

2. In a vehicle, a pair of axles, wheels on said axles, longitudinally disposed chassis members, means connecting said axles to said longitudinal chassis members, said axles and longitudinal chassis members constituting a frame, a body, body supporting members secured to said frame, the upper ends of said members being disposed at the sides of the body and being spaced apart in a transverse direction more widely than the lower parts of said members.

3. In a vehicle, a pair of axles, wheels on said axles, longitudinally disposed chassis members, means connecting said axles to said longitudinal chassis members, a body, body supporting members which are cranked intermediate their ends whereby the upper ends of said members are spaced apart in a transverse direction more widely than the lower parts of said members.

4. In a vehicle, a pair of axles, wheels on said axles, longitudinally disposed chassis members, means connecting said axles to said longitudinal chassis members, said axles and longitudinal chassis members constituting a frame, a body, body supporting members secured to said frame which are cranked intermediate their ends whereby the upper ends of said members are disposed at the sides of the body and are spaced apart in a transverse direction more widely than the lower parts of said members.

5. In a vehicle, a pair of axles, wheels on said axles, longitudinally disposed chassis members, means connecting said axles to said longitudinal chassis members, a body, body supporting members, the upper ends of said supporting members being disposed at the sides of the body, rods passing through the body from side to side, and means for connecting said supporting members to the ends of said rods.

6. In a vehicle, a pair of axles, wheels on said axles, longitudinally disposed chassis members, means connecting said axles to said longitudinal chassis members, a body, body supporting members, the upper ends of said members being spaced apart in a transverse direction more widely than the lower parts of said members, rods passing through the body from side to side, and means for connecting said supporting members to the ends of said rods.

7. In a manually propelled vehicle in combination a pair of axles, wheels on said axles, a body, a propelling handle, longitudinal members connected to said handle but not connected to the body, and body supporting members associated independently with said axles and with the longitudinal members and serving to position said longitudinal members in relation to the axles.

8. In a manually propelled vehicle in combination, a pair of axles, wheels on said axles, a body, body supporting members connected at their ends to said axles, a propelling handle, longitudinal members connected to said handle and secured to said body supporting members intermediate the ends of said body supporting members.

9. In a manually propelled vehicle in combination, a pair of axles, wheels on said axles, a body, body supporting members connected at their ends to said axles, a propelling handle, longitudinal members connected to said handle and secured to said body supporting members intermediate the ends of said body supporting members, and the upper ends of said body supporting members being spaced apart in a transverse direction more widely than are the lower parts of said members.

10. In a manually propelled vehicle in combination, a pair of axles, wheels on said axles, a body, a propelling handle, longitudinal members connected to said handle and having their ends located beneath the axles and body supporting members connected independently to said axles and to the longitudinal members.

In testimony whereof I affix my signature.

WILLIAM HENRY DUNKLEY.